United States Patent
Takakuwa et al.

(10) Patent No.: US 12,006,943 B2
(45) Date of Patent: Jun. 11, 2024

(54) WATERPROOF FAN

(71) Applicant: SANYO DENKI CO., LTD., Tokyo (JP)

(72) Inventors: Munenori Takakuwa, Tokyo (JP); Hyukjun Kwon, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 155 days.

(21) Appl. No.: 17/732,604

(22) Filed: Apr. 29, 2022

(65) Prior Publication Data

US 2022/0368188 A1    Nov. 17, 2022

(30) Foreign Application Priority Data

May 14, 2021    (JP) .................................. 2021-082434

(51) Int. Cl.
*F04D 25/06*    (2006.01)
*F04D 19/00*    (2006.01)
(Continued)

(52) U.S. Cl.
CPC ....... *F04D 25/0693* (2013.01); *F04D 19/002* (2013.01); *F04D 25/0613* (2013.01);
(Continued)

(58) Field of Classification Search
CPC ............. F04D 25/0646; F04D 25/0613; F04D 19/002; F04D 25/0693; F04D 29/023; F04D 29/083; F04D 25/0633; F04D 29/522; H02K 7/14; H02K 5/08; H02K 1/187; H02K 2211/03; H02K 3/44; H02K 5/163; H02K 7/085
See application file for complete search history.

(56) References Cited

U.S. PATENT DOCUMENTS 6,359,354 B1 *    3/2002    Watanabe ........... F04D 25/0693
                                                              310/43
6,828,706 B2 *   12/2004    Kudo .................. F04D 25/0646
                                                              310/43
(Continued)

FOREIGN PATENT DOCUMENTS

DE    202006018454 U1    4/2007
JP    2020-88990 A    6/2020

OTHER PUBLICATIONS

Extended European Search Report (EESR) dated Sep. 28, 2022 for European Patent Application No. 22169838.4.

*Primary Examiner* — Peter J Bertheaud
(74) *Attorney, Agent, or Firm* — RANKIN, HILL & CLARK LLP

(57)    ABSTRACT

A waterproof fan includes: a rotor including a rotating blade capable of rotating about a rotation axis; a stator including a plurality of stator cores extending in a radial direction relative to the rotation axis, and a winding wound around each of the stator cores; a frame including a housing space opening toward one side of the rotation axis; a circuit board electrically connected to the winding and housed in the housing space; a waterproofing resin portion covering the stator and the circuit board to block the opening of the housing space; and a positioning member provided in the housing space and configured to position the circuit board at a position away from an inner wall of the housing space.

5 Claims, 3 Drawing Sheets

(51) Int. Cl.
| | |
|---|---|
| *F04D 29/02* | (2006.01) |
| *F04D 29/08* | (2006.01) |
| *F04D 29/52* | (2006.01) |
| *H02K 1/18* | (2006.01) |
| *H02K 3/44* | (2006.01) |
| *H02K 5/08* | (2006.01) |
| *H02K 5/16* | (2006.01) |
| *H02K 7/08* | (2006.01) |
| *H02K 7/14* | (2006.01) |
| *H02K 21/22* | (2006.01) |

(52) U.S. Cl.
CPC ..... *F04D 25/0633* (2013.01); *F04D 25/0646* (2013.01); *F04D 29/023* (2013.01); *F04D 29/083* (2013.01); *F04D 29/522* (2013.01); *H02K 1/187* (2013.01); *H02K 3/44* (2013.01); *H02K 5/08* (2013.01); *H02K 5/163* (2013.01); *H02K 7/085* (2013.01); *H02K 7/14* (2013.01); *H02K 21/22* (2013.01); *H02K 2211/03* (2013.01)

(56) References Cited

U.S. PATENT DOCUMENTS

| | | | |
|---|---|---|---|
| 7,117,580 B2 * | 10/2006 | Kudou | H02K 5/10 |
| | | | 310/43 |
| 7,667,359 B2 * | 2/2010 | Lee | H02K 5/04 |
| | | | 310/43 |
| 10,110,085 B2 * | 10/2018 | Lin | H02K 1/04 |
| 10,465,692 B2 * | 11/2019 | Kudo | F04D 25/082 |
| 11,552,533 B2 * | 1/2023 | Yamasaki | F04D 19/002 |
| 2007/0126296 A1 | 6/2007 | Lee et al. | |
| 2010/0264762 A1 | 10/2010 | Dautel et al. | |
| 2011/0074230 A1 | 3/2011 | Hasegawa et al. | |
| 2017/0353090 A1 | 12/2017 | Takaki et al. | |
| 2018/0175696 A1 | 6/2018 | Jang et al. | |
| 2020/0161941 A1 | 5/2020 | Yamasaki et al. | |
| 2020/0303990 A1 | 9/2020 | Takakuwa et al. | |

* cited by examiner

WATERPROOF FAN

CROSS-REFERENCE TO RELATED APPLICATION

This application is based on Japanese Patent Application No. 2021-082434 filed with the Japan Patent Office on May 14, 2021, the entire content of which is hereby incorporated by reference.

BACKGROUND

1. Technical Field

One aspect of the present disclosure relates to a waterproof fan.

2. Related Art

A waterproof fan where electronic components including a circuit board and the like are covered with resin is known from, for example, JP-A-2020-88990. In the waterproof fan described in JP-A-2020-88990, a base-side protruding portion extending from a frame is brought into contact with a bottom surface of the circuit board. Accordingly, the circuit board is supported by the frame. The base-side protruding portion is provided to a radially outward part of the waterproof fan and therefore can support the circuit board stably.

SUMMARY

A waterproof fan includes: a rotor including a rotating blade capable of rotating about a rotation axis; a stator including a plurality of stator cores extending in a radial direction relative to the rotation axis, and a winding wound around each of the stator cores; a frame including a housing space opening toward one side of the rotation axis; a circuit board electrically connected to the winding and housed in the housing space; a waterproofing resin portion covering the stator and the circuit board to block the opening of the housing space; and a positioning member provided in the housing space and configured to position the circuit board at a position away from an inner wall of the housing space.

DETAILED DESCRIPTION

Figure 1:
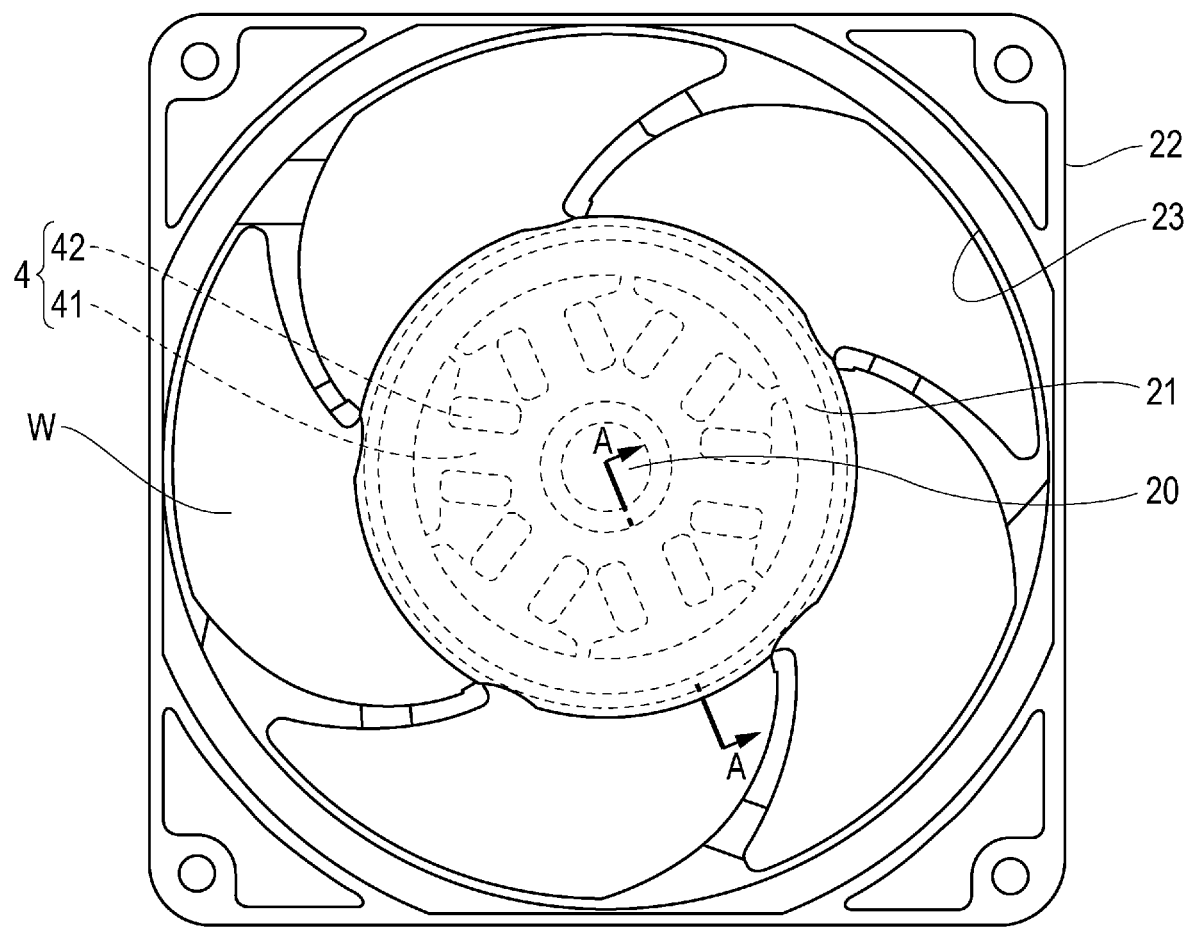
FIG. 1 is a front view of a waterproof fan according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The frame requires strength. Therefore, a metal is used for the frame. The coefficient of linear expansion of a waterproofing resin that covers the electronic components (including the circuit board and the like) is very different from the coefficient of linear expansion of the metal forming the frame. Hence, a gap may be created in an interface between the waterproofing resin and the frame when thermal stress acts repeatedly on the waterproof fan, which may allow the ingress of water into the waterproof fan through the gap.

In such a case, the circuit board is supported by the frame in the waterproof fan described in JP-A-2020-88990, water may enter through the gap along the frame, and the water that has entered may reach the circuit board.

One object of the present disclosure is to provide a waterproof fan that resists the ingress of water to a circuit board even if thermal stress acts repeatedly on the waterproof fan.

A waterproof fan according to one aspect of the present disclosure (the present waterproof fan) includes: a rotor including a rotating blade capable of rotating about a rotation axis; a stator including a plurality of stator cores extending in a radial direction relative to the rotation axis, and a winding wound around each of the stator cores; a frame including a housing space opening toward one side of the rotation axis; a circuit board electrically connected to the winding and housed in the housing space; a waterproofing resin portion covering the stator and the circuit board to block the opening of the housing space; and a positioning member provided in the housing space and configured to position the circuit board at a position away from an inner wall of the housing space.

The present waterproof fan resists the ingress of water to the circuit board even if thermal stress acts repeatedly on the waterproof fan.

An embodiment of the present disclosure is described hereinafter with reference to the drawings. Descriptions of members having the same reference numerals as members that have already been described in the detailed description are omitted for the convenience of description. Moreover, the dimensions of each member illustrated in the drawings may be different from actual dimensions thereof for the convenience of description.

FIG. 1 is a front view of a waterproof fan 1 according to the embodiment. As illustrated in FIG. 1, the waterproof fan 1 includes a plurality of (five in the example illustrated in the drawing) rotating blades W that can rotate about the axis of a rotating shaft portion 20, and a cylindrical casing C that surrounds the outer periphery of the rotating blades W. The waterproof fan 1 rotates the rotating blades W to produce a current of air that flows from one side to the other in a direction of the axis of the rotating shaft portion 20 (in a front-to-back direction of the drawing sheet). In the following description, for the sake of convenience, the direction of the axis of the rotating shaft portion 20 may be referred to as a direction of a "rotation axis X." Moreover, a direction orthogonal to the rotation axis X may be referred to as a "radial direction."

The plurality of rotating blades W is radially attached to the perimeter of an impeller 21. The impeller 21 is formed in a substantially cup shape, and is provided in such a manner as to surround the rotating shaft portion 20. The inner structure of a stator 4 of the waterproof fan 1 illustrated in FIG. 1 is drawn by broken lines.

The rotating blades W attached to the impeller 21 rotate and produce a current of air between the rotating blades W and the casing C. The rotating blades W are formed in such a manner as to have a shape and structure that produce a current of air from one side to the other of the rotation axis X. Moreover, the casing C that surrounds the rotating blades W includes a frame portion 22 formed in the form of a rectangle, and a circular wind-tunnel portion 23 that is defined in the center of the frame portion 22 and guides air flow.

Figure 2:
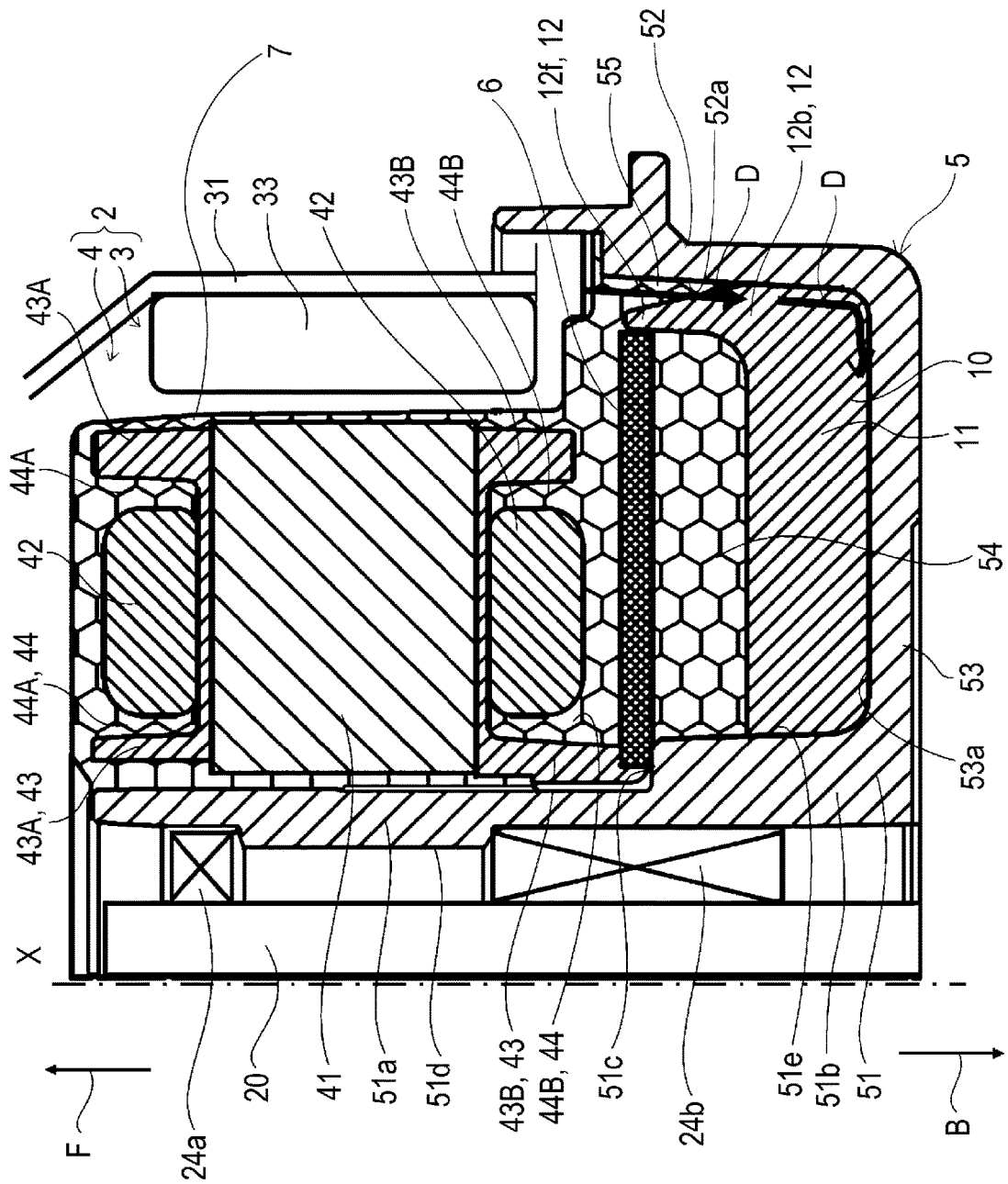
FIG. 2 is a cross-sectional view of the waterproof fan illustrated in FIG. 1, taken along line A-A.

FIG. 2 is a cross-sectional view of the waterproof fan taken along line A-A in FIG. 1. In the following description, the one side of the rotation axis X may be referred to as a front F, and the other side, which is opposite to the one side, of the rotation axis X may be referred to as a back B for the sake of convenience.

As illustrated in FIG. 2, the waterproof fan 1 includes a motor 2 that rotationally drives the rotating blades W. The motor 2 is provided inside the impeller 21 to which the rotating blades W are attached. The motor 2 is configured as, for example, an outer rotor brushless motor. The motor 2 includes the stator 4, and a rotor 3 that is placed outward of the stator 4. In FIG. 2, a simplified illustration of the rotor 3 is provided.

The rotor 3 includes a substantially cup-shaped rotor cover 31, the rotating shaft portion 20, and permanent magnets 33 fixed to the rotor cover 31. The rotating shaft portion 20 is press-fitted by a bush (not illustrated) in the central part of the rotor cover 31.

The rotor cover 31 is fitted in the impeller 21. The impeller 21 where the rotor cover 31 is fitted is fixed to the rotating shaft portion 20 via the bush (not illustrated). The rotor cover 31 is mainly made of, for example, a magnetic substance such as a carbon steel casting (SC material). The permanent magnets 33 are fastened to an inner peripheral surface in the radial direction of the rotor cover 31 in such a manner as to be arranged in the peripheral direction. Magnetic lines of force are confined by the rotor cover 31 so that the electromagnetic induction effect increases.

The rotating shaft portion 20 is supported by a bearing 24 (a first bearing 24a and a second bearing 24b) in such a manner as to be rotatable. The bearing 24 is fixed to a tubular inner cylinder portion 51 formed in the central part of a frame 5 described below.

The stator 4 includes a plurality of stator cores 41 placed inward in the radial direction relative to the rotating blades W, and a winding 42 that is wound around each of the stator cores 41.

Each of the stator cores 41 extends in the radial direction relative to the rotation axis X. The stator core 41 is formed by laminating a plurality of thin metal plates in the thickness direction. Examples of the material of the stator core 41 include a silicon steel plate.

Each of the stator cores 41 is provided outward in the radial direction relative to the inner cylinder portion 51 via an insulator 43. The insulator 43 includes a front insulator 43A provided to a surface at the front F of the stator core 41, and a back insulator 43B provided to a surface at the back B of the stator core 41.

The front insulator 43A is provided with a front inner protruding portion and a front outer protruding portion that extend in the direction of the rotation axis X. A front slot 44A is formed between the front inner protruding portion and the front outer protruding portion.

The back insulator 43B is also provided with a back inner protruding portion and a back outer protruding portion that extend in the direction of the rotation axis X. A back slot 44B is formed between the back inner protruding portion and the back outer protruding portion.

The winding 42 is wound around the stator core 41. The winding 42 is housed between the front slot 44A and the back slot 44B. The front insulator 43A is located between the winding 42 and the front surface of the stator core 41. Moreover, the back insulator 43B is located between the winding 42 and the back surface of the stator core 41. Hence, the winding 42 is not electrically continuous with the stator core 41. Moreover, the shape of the front insulator 43A is larger than the shape of the stator core 41, and the shape of the back insulator 43B is larger than the shape of the stator core 41, as viewed in the direction of the rotation axis X. Hence, the winding 42 located between the front insulator 43A and the back insulator 43B is not electrically continuous with the stator core 41, either.

The waterproof fan 1 further includes the frame 5, and a circuit board 6 that is housed in the frame 5.

The frame 5 is provided at a position in the back B of the waterproof fan 1. The frame 5 has a substantially cup shape. The frame 5, and the impeller 21 to which the rotating blades W are attached are provided along the direction of the rotation axis X in such a manner that inner sides of the cup shapes are in positions facing each other.

The frame 5 includes the inner cylinder portion 51 provided inward in the radial direction, an outer cylinder portion 52 that has a larger diameter than the inner cylinder portion 51 and is provided outward in the radial direction, and a bottom portion 53 provided in the back B to connect the inner cylinder portion 51 and the outer cylinder portion 52. The frame 5 includes a housing space 54 that is mainly formed by the inner cylinder portion 51, the outer cylinder portion 52, and the bottom portion 53 to house the circuit board 6.

The inner cylinder portion 51 is provided in such a manner as to continuously extend toward the front F from an inner end in the radial direction of the bottom portion 53. The inner cylinder portion 51 includes a small-diameter portion 51a and a large-diameter portion 51b. The small-diameter portion 51a is a part forming a portion, which is closer to the front F, of the inner cylinder portion 51. The large-diameter portion 51b is a part forming a portion, which is closer to the back B, of the inner cylinder portion 51, and having a larger diameter than the small-diameter portion 51a. A step portion 51c is formed on a boundary between the small-diameter portion 51a and the large-diameter portion 51b, using a difference between the diameters thereof. The step portion 51c is formed on an outer side in the radial direction of the inner cylinder portion 51.

The small-diameter portion 51a of the inner cylinder portion 51 is inserted through the central part of the stator 4. The bearing 24 (the first bearing 24a and the second bearing 24b) that supports the rotating shaft portion 20 is fixed to an inner peripheral surface 51d in the radial direction of the small-diameter portion 51a. Moreover, the stator cores 41 of the stator 4 are placed outward in the radial direction relative to the small-diameter portion 51a.

The outer cylinder portion 52 is provided in such a manner as to continuously extend toward the front F from an outer end in the radial direction of the bottom portion 53. The outer cylinder portion 52 in the example illustrated in the drawing is formed in such a manner that the height of the portion extending toward the front F is less than the height of the inner cylinder portion 51. The height of the outer cylinder portion 52 is formed in such a manner as to be greater than at least the height of the step portion 51c formed on the inner cylinder portion 51.

The bottom portion 53 is provided in such a manner as to expand in the radial direction from an outer peripheral surface in the radial direction of the inner cylinder portion 51 across to an inner peripheral surface in the radial direction of the outer cylinder portion 52. The bottom portion 53 is provided in such a manner as to cover the back B of the stator 4.

The housing space 54 is formed by an outer peripheral surface 51e in the radial direction of the inner cylinder portion 51 including the small-diameter portion 51a and the large-diameter portion 51b, a surface 53a at the front F of the bottom portion 53, and an inner peripheral surface 52a in the radial direction of the outer cylinder portion 52. The surface 53a at the front F of the bottom portion 53 serves as the bottom surface 53a of the housing space 54. The housing space 54 is a space that opens toward the front F. The housing space 54 is a space that opens toward the stator 4.

The housing space 54 is provided with a positioning member 10 that positions the circuit board 6 to be housed in the housing space 54. In other words, the waterproof fan 1 includes the positioning member 10 that is provided in the housing space 54 and positions the circuit board 6 at a position away from an inner wall of the housing space 54. The positioning member 10 is mainly (substantially) made of a resin. In other words, the positioning member 10 includes the resin. The positioning member 10 is provided in such a manner as to fill a part of an area in the back B of the housing space 54, that is, to be placed on the bottom surface 53a of the housing space 54. The positioning member 10 includes a base portion 11 provided in such a manner as to be in contact with the bottom surface 53a of the housing space 54, and a protruding portion 12 extending from the base portion 11 toward the front F.

The protruding portion 12 extends toward the front F from an outer end in the radial direction of the base portion 11. The protruding portion 12 is provided in such a manner that a back portion 12b at the back B is in contact with the inner peripheral surface 52a of the outer cylinder portion 52. Furthermore, the protruding portion 12 is provided in such a manner that a front portion 12f at the front F is away from the inner peripheral surface 52a of the outer cylinder portion 52. In the example illustrated in the drawing, a gap 55 is formed between the front portion 12f of the protruding portion 12 and the inner peripheral surface 52a of the outer cylinder portion 52. A distal end at the front F of the front portion 12f of the protruding portion 12 is provided at a position level with the step portion 51c of the inner cylinder portion 51, or a position extending farther toward the front F than the step portion 51c.

In the housing space 54, the circuit board 6 is supported by the step portion 51c of the inner cylinder portion 51 and the front portion 12f of the protruding portion 12 of the positioning member 10. The circuit board 6 is placed in the back B of the stator 4. The circuit board 6 is formed in the form of a circle. The circuit board 6 is provided in the central part with an opening where the inner cylinder portion 51 of the frame 5 can be inserted. In the circuit board 6, the step portion 51c of the inner cylinder portion 51 supports an inner portion in the radial direction of the circuit board 6, and the front portion 12f of the protruding portion 12 of the positioning member 10 supports an outer portion in the radial direction of the circuit board 6.

The position of the circuit board 6 in the direction of the rotation axis X is determined by the step portion 51c of the inner cylinder portion 51. Moreover, the position of the circuit board 6 in the radial direction is determined by the front portion 12f of the protruding portion 12 of the positioning member 10. The front portion 12f of the protruding portion 12 of the positioning member 10 positions the outer portion in the radial direction of the circuit board 6 at a position away from the inner peripheral surface 52a of the outer cylinder portion 52. A wiring pattern for controlling the waterproof fan 1 is formed on the circuit board 6. The circuit board 6 is electrically connected to the windings 42 wound around the stator cores 41.

Figure 3:
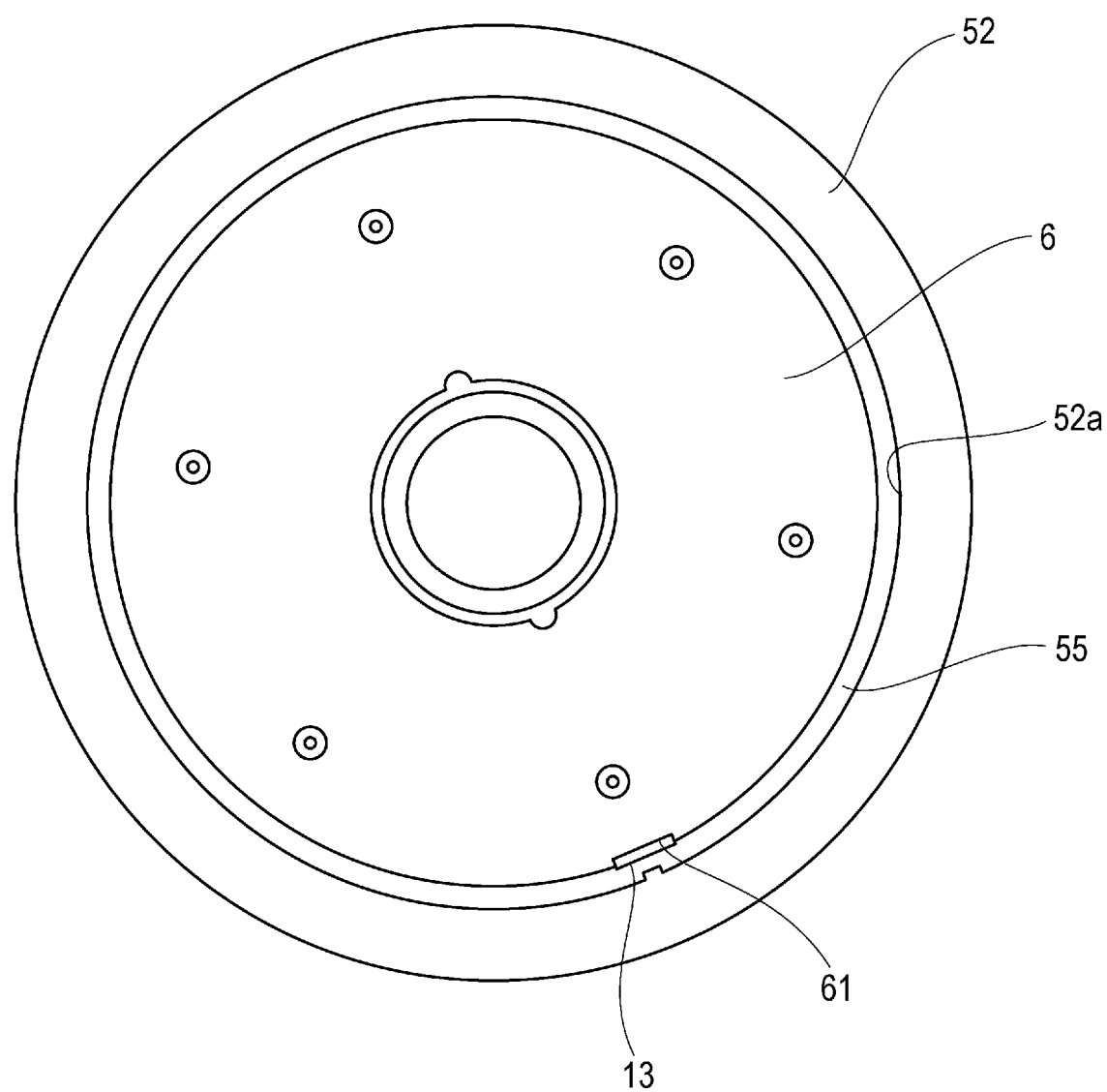
FIG. 3 is a cross-sectional view of the waterproof fan, passing through a circuit board.

FIG. 3 is a cross-sectional view of the waterproof fan 1 taken along the radial direction passing through the circuit board 6.

As illustrated in FIG. 3, an outer edge of the circuit board 6 is provided with, for example, a fitted portion 61 formed as a recessed groove. The positioning member 10 that determines the position of the circuit board 6 fits in the fitted portion 61. The distal end of the front portion 12f of the protruding portion 12 of the positioning member 10 is provided with a fitting portion 13 that fits in the fitted portion 61 of the circuit board 6. The fitting portion 13 is formed in a shape fitting the recessed groove of the fitted portion 61.

The fitting portion 13 of the positioning member 10 fits in the fitted portion 61 of the circuit board 6, which enables the positioning member 10 to determine the position of the outer portion in the radial direction of the circuit board 6. The outer portion in the radial direction of the circuit board 6 is positioned at a position separated by a distance of the gap 55 from the inner peripheral surface 52a of the outer cylinder portion 52.

Return to FIG. 2. The waterproof fan 1 further includes a waterproofing resin portion 7 that covers the stator 4 and the circuit board 6. The waterproofing resin portion 7 is mainly (substantially) made of an electrical insulating synthetic resin. In other words, the waterproofing resin portion 7 includes an electrical insulating synthetic resin. The waterproofing resin portion 7 is mainly made of, for example, a thermosetting epoxy resin.

The waterproofing resin portion 7 is formed by filling the resin in such a manner as to cover the stator 4 and the circuit board 6 to block the opening of the housing space 54. In the housing space 54, the resin mainly forming the waterproofing resin portion 7 is filled in, for example, a gap between the circuit board 6 and the stator 4, a gap between the circuit board 6 and the positioning member 10, and the gap 55 between the front portion 12f of the protruding portion 12 of the positioning member 10 and the inner peripheral surface 52a of the outer cylinder portion 52.

The resin mainly forming the waterproofing resin portion 7 and the resin mainly forming the positioning member 10 are resins different from each other. In other words, the positioning member 10 includes the resin different from the resin included in the waterproofing resin portion 7.

The resin used for the waterproofing resin portion 7 includes a material different from that of the frame in many cases. If the materials are different, a gap is created between the waterproofing resin portion and the frame with a change in ambient temperature due to a difference in the coefficient of linear expansion. The gap tends to be created especially if the frame is made of a metal material. If a gap is created between the resin for water resistance and the frame, water may enter the gap from the outside and reach the circuit board.

In contrast, in the waterproof fan 1 according to the embodiment, the positioning member 10 that positions the circuit board 6 at the position away from the inner peripheral surface 52a of the outer cylinder portion 52 is provided in the housing space 54. According to this configuration, the positioning member 10 that positions the circuit board 6 is provided, as a separate member from the frame 5, in the housing space 54 of the frame 5. The positioning member 10 positions the circuit board 6 housed in the housing space 54 so that the circuit board 6 is separated from the inner wall of the housing space 54. Hence, if a gap is created between the frame 5 and the waterproofing resin portion 7 with a change in ambient temperature, the water that enters through the gap along the frame 5 can be penetrated as indicated by, for example, an arrow D in FIG. 2. Hence, it is possible to restrain the water that has entered from reaching the circuit board 6. In the illustrated example, the fitting portion 13, which is provided at the position away from the inner peripheral surface 52*a* of the outer cylinder portion 52, of the positioning member 10 positions the circuit board 6.

Moreover, according to the waterproof fan 1, the frame 5 includes the inner cylinder portion 51 that supports the bearing 24, the outer cylinder portion 52 that has a larger diameter than the inner cylinder portion 51 and extends toward the front F from the outer end in the radial direction of the bottom portion 53, and the bottom portion 53 that connects the inner cylinder portion 51 and the outer cylinder portion 52 in the back B and forms the bottom surface of the housing space 54. The outer peripheral surface 51*e* of the inner cylinder portion 51, the bottom surface 53*a* at the front F of the bottom portion 53, and the inner peripheral surface 52*a* of the outer cylinder portion 52 form the housing space 54. Consequently, the circuit board 6 can be housed in the housing space 54 that opens toward the front F in such a manner that the outer peripheral surface 51*e*, the bottom surface 53*a*, and the inner peripheral surface 52*a* surround the circuit board 6.

Moreover, according to the waterproof fan 1, the inner cylinder portion 51 includes the small-diameter portion 51*a* inserted through the stator 4, and the large-diameter portion 51*b* that has a larger diameter than the small-diameter portion 51*a* and is located closer to the back B than the small-diameter portion 51*a*. The circuit board 6 is positioned in the direction of the rotation axis X by the step portion 51*c* between the small-diameter portion 51*a* and the large-diameter portion 51*b*, and positioned in the peripheral direction of the rotation axis X by the positioning member 10. Consequently, the circuit board 6 can be positioned in the front-and-back direction and the left-and-right direction. Therefore, the circuit board 6 can be positioned accurately.

Generally, the stator 4 is provided in the inner area in the radial direction in the motor 2 including the rotor 3 and the stator 4, which enables resisting the ingress of water. In contrast, water easily enters the outer area in the radial direction. Moreover, in terms of the positioning of the member used in the motor 2, positioning accuracy is increased if the positioning is performed on the outer side in the radial direction. On the other hand, according to the waterproof fan 1 of the embodiment, the fitting portion 13 is provided to the front portion 12*f*, away from the inner peripheral surface 52*a* of the outer cylinder portion 52 of the frame 5, of the protruding portion 12 of the positioning member 10, and fits in the fitted portion 61 provided in the outer edge of the circuit board 6. Consequently, the positioning member 10 positions the circuit board 6. Hence, it is possible to increase water resistance for the circuit board 6 and increase the positioning accuracy of the circuit board 6.

Moreover, according to the waterproof fan 1, the positioning member 10 includes the base portion 11 that is in contact with the bottom surface 53*a* of the housing space 54, and the protruding portion 12 that extends from the base portion 11 toward the front F. The positioning member 10 is provided in such a manner that the base portion 11 is placed on the bottom surface 53*a* of the housing space 54 and fills in a part of the area at the back B of the housing space 54. Furthermore, the protruding portion 12 extending toward the front F supports the circuit board 6. The positioning member 10 is provided in the housing space 54 in this manner, which enables reducing the amount of waterproofing resin to be filled in the housing space 54. Hence, it is possible to reduce the filling time and the curing time of the waterproofing resin.

Moreover, according to the waterproof fan 1, the positioning member 10 includes the resin different from the resin included in the waterproofing resin portion 7. A liquid waterproofing resin is filled to form the waterproofing resin portion 7. Hence, the waterproofing resin requires a characteristic according to which it is easily filled. On the other hand, the positioning member 10 does not have such a requirement. Therefore, for example, an inexpensive resin can be used as the resin of the positioning member 10. In this manner, the resin of the waterproofing resin portion 7 and the resin of the positioning member 10 can be made different from each other. Therefore, the degree of freedom in the selection of materials can be increased.

Up to this point the embodiment of the present disclosure has been described. In terms of this, it is needless to say that the technical scope of the present disclosure should not be construed in a limited manner by the description of the embodiment. The embodiment is a mere example. Those skilled in the art understand that the embodiment can be modified in various manners within the technical scope of the present disclosure described in the claims. The technical scope of the present disclosure should be determined on the basis of the scope described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A waterproof fan comprising:
   a rotor including a rotating blade capable of rotating about a rotation axis;
   a stator including
   a plurality of stator cores extending in a radial direction relative to the rotation axis, and
   a winding wound around each of the stator cores;
   a frame including a housing space opening toward one side of the rotation axis;
   a circuit board electrically connected to the winding and housed in the housing space;
   a waterproofing resin portion covering the stator and the circuit board to block the opening of the housing space; and
   a positioning member provided in the housing space and configured to position the circuit board at a position away from an inner wall of the housing space, wherein
   the housing space includes a bottom surface on another side of the rotation axis,
   the positioning member includes:
      a base portion in contact with the bottom surface of the housing space; and
      a protruding portion extending from the base portion toward the one side of the rotation axis, and
   the protruding portion is in contact with the circuit board.

2. The waterproof fan according to claim 1, wherein the positioning member includes a resin different from a resin included in the waterproofing resin portion.

3. The waterproof fan according to claim 1, wherein a fitting portion provided on the positioning member fits in a fitted portion provided in an outer edge of the circuit board, and therefore the positioning member positions the circuit board.

4. A waterproof fan comprising:
  a rotor including a rotating blade capable of rotating about a rotation axis;
  a stator including
    a plurality of stator cores extending in a radial direction relative to the rotation axis, and
    a winding wound around each of the stator cores;
  a frame including a housing space opening toward one side of the rotation axis;
  a circuit board electrically connected to the winding and housed in the housing space;
  a waterproofing resin portion covering the stator and the circuit board to block the opening of the housing space; and
  a positioning member provided in the housing space and configured to position the circuit board at a position away from an inner wall of the housing space, wherein
  the rotor includes a rotating shaft portion supported by a bearing,
  the frame includes:
    an inner cylinder portion supporting the bearing;
    an outer cylinder portion having a larger diameter than the inner cylinder portion, and
    a bottom portion connecting the inner and outer cylinder portions on another side of the rotation axis and forming a bottom surface of the housing space,
  the outer cylinder portion extends from an end in the radial direction of the bottom portion toward the one side of the rotation axis, and
  the housing space is formed by an outer peripheral surface of the inner cylinder portion, a surface of the bottom portion on the one side of the rotation axis, and an inner peripheral surface of the outer cylinder portion.

5. The waterproof fan according to claim 4, wherein
  the inner cylinder portion includes:
    a small-diameter portion inserted through the stator; and
    a large-diameter portion having a larger diameter than the small-diameter portion and being located on the other side of the rotation axis relative to the small-diameter portion, and
  the circuit board is positioned in a direction of the rotation axis by a step portion between the small-diameter portion and the large-diameter portion, and positioned in a peripheral direction of the rotation axis by the positioning member.

* * * * *